(12) United States Patent
Greer et al.

(10) Patent No.: US 12,043,163 B2
(45) Date of Patent: Jul. 23, 2024

(54) SMART RECREATIONAL VEHICLE POWER CENTER

(71) Applicants: Christopher Greer, Syracuse, IN (US); Errin Tribble, Bradenton, FL (US)

(72) Inventors: Christopher Greer, Syracuse, IN (US); Errin Tribble, Bradenton, FL (US)

( * ) Notice: Subject to any disclaimer, the term of this patent is extended or adjusted under 35 U.S.C. 154(b) by 691 days.

(21) Appl. No.: 17/105,774

(22) Filed: Nov. 27, 2020

(65) Prior Publication Data

US 2021/0155142 A1 May 27, 2021

Related U.S. Application Data

(60) Provisional application No. 62/940,557, filed on Nov. 26, 2019.

(51) Int. Cl.
| | | |
|---|---|---|
| *H02J 3/14* | (2006.01) | |
| *B60P 3/36* | (2006.01) | |
| *H02J 9/06* | (2006.01) | |
| *H05B 47/19* | (2020.01) | |

(52) U.S. Cl.
CPC ............ *B60P 3/36* (2013.01); *H02J 3/14* (2013.01); *H05B 47/19* (2020.01); *H02J 9/062* (2013.01); *H02J 2310/40* (2020.01)

(58) Field of Classification Search
CPC ..... B60P 3/36; H02J 3/14; H02J 9/062; H02J 2310/40; H02J 1/08; H02J 4/00; H02J 2310/44; H02J 7/35; H05B 47/19; Y02B 20/40; B60R 16/03; H02M 7/44; H02M 7/06; H02M 7/48; H02M 7/04; H02M 7/46; H02M 7/797; H02M 7/064; H02M 7/062; H02M 7/066; H02M 7/068; H02M 7/10; H02M 7/08; H02M 7/4803; H02M 7/145; H02M 7/483; H02M 7/4807; H02M 7/125; H02M 7/4815; H02M 7/493; H02M 7/12; H02M 7/26

See application file for complete search history.

(56) References Cited

U.S. PATENT DOCUMENTS

| | | |
|---|---|---|
| 4,307,436 A | 12/1981 | Eckart et al. |
| 5,023,752 A | 6/1991 | Detter et al. |
| 5,310,353 A | 5/1994 | Parrish et al. |
| 5,513,077 A | 4/1996 | Stribel |
| 5,594,285 A | 1/1997 | Wisbey et al. |
| 6,015,302 A | 1/2000 | Butts et al. |
| 6,045,412 A | 4/2000 | Guanco et al. |

(Continued)

*Primary Examiner* — Lincoln D Donovan
*Assistant Examiner* — Alex W Lam
(74) *Attorney, Agent, or Firm* — Sanders Pianowski LLP

(57) ABSTRACT

A smart power center is for use in controlling DC power in mobile living quarters, such as an RV, and has switched outputs that are controlled using a mobile device, such as smartphone or tablet. The switched outputs connect DC power from a DC power source to an accessory, such as a light, fan, or motor. Some accessories, such as landing gear or slide-out rooms, require the polarity from the power source to be reversed for proper function. These are connected to reversing outputs which connect DC power from the DC power source in one orientation for one direction and a reversed orientation for the other direction. Smart override switches can be wired to the smart power center in the event the user desires to control the switched outputs without the mobile device.

16 Claims, 10 Drawing Sheets

(56) References Cited

U.S. PATENT DOCUMENTS

| | | |
|---|---|---|
| 6,178,106 B1 | 1/2001 | Umemoto et al. |
| 6,679,708 B1 | 1/2004 | Depp et al. |
| 7,162,653 B2 | 1/2007 | Mares et al. |
| 8,599,536 B1 | 12/2013 | Jorgensen et al. |
| 2005/0200323 A1* | 9/2005 | Svobodnik ............... H02P 7/28 318/400.29 |
| 2006/0022522 A1 | 2/2006 | Plummer |
| 2008/0153325 A1 | 6/2008 | Boileau et al. |
| 2010/0149708 A1 | 6/2010 | Fuller et al. |
| 2010/0314935 A1 | 12/2010 | Reichart et al. |
| 2013/0197748 A1* | 8/2013 | Whitaker .............. B60L 53/305 701/1 |
| 2015/0006026 A1 | 1/2015 | Schaffer et al. |
| 2018/0162298 A1 | 6/2018 | Malcom et al. |
| 2022/0408604 A1 | 12/2022 | Neuman et al. |

\* cited by examiner

SMART RECREATIONAL VEHICLE POWER CENTER

CROSS REFERENCE TO RELATED APPLICATIONS

This application claims the benefit of U.S. Provisional Application No. 62/940,557, filed Nov. 26, 2019, the disclosures of which are hereby incorporated by reference.

BACKGROUND OF THE INVENTION

This present disclosure relates to power distribution centers or panels used with recreational vehicles, travel trailers, motorhomes, or other movable spaces that use battery power and/or household AC current. A power distribution panel controls the flow of electricity to and from an onboard battery, generator, shore power, and to various lights, motors, appliances, or other devices that use electricity. Many power distribution centers include a battery charger or some device for controlling onboard batteries. These devices are similar to a household circuit breaker panel and contain no controls or output switching functionality. An improved power center is needed.

SUMMARY OF THE INVENTION

The present disclosure describes a smart power center that can be used for remotely controlling motorized accessories and switch power to different devices. The power center includes a DC distribution section, AC distribution section, and an optional power converter section. The power converter supplies 12V DC power when the RV is attached to shore power. The DC section contains a circuit board with relays and a controller for switching power to different devices and polarity reversing outputs. It also includes a wireless portion that communicates to a mobile device, through Bluetooth, NFC, Wi-Fi, or other communication protocol. The user pairs their mobile device to the power center and can use settings and buttons on their device to control various outputs on the power center. The outputs can be configured to be momentary or latching, depending on the needs of the user. Some of the outputs are reversible for use with motorized devices. The switching is done wirelessly through an application on a mobile device. In the event a mobile device is not available, the power center can be manually configured to operate as a standalone device without a mobile device. Smart override switches may be incorporated to provide additional control by the user.

DESCRIPTION OF THE PREFERRED EMBODIMENT

Figure 1:
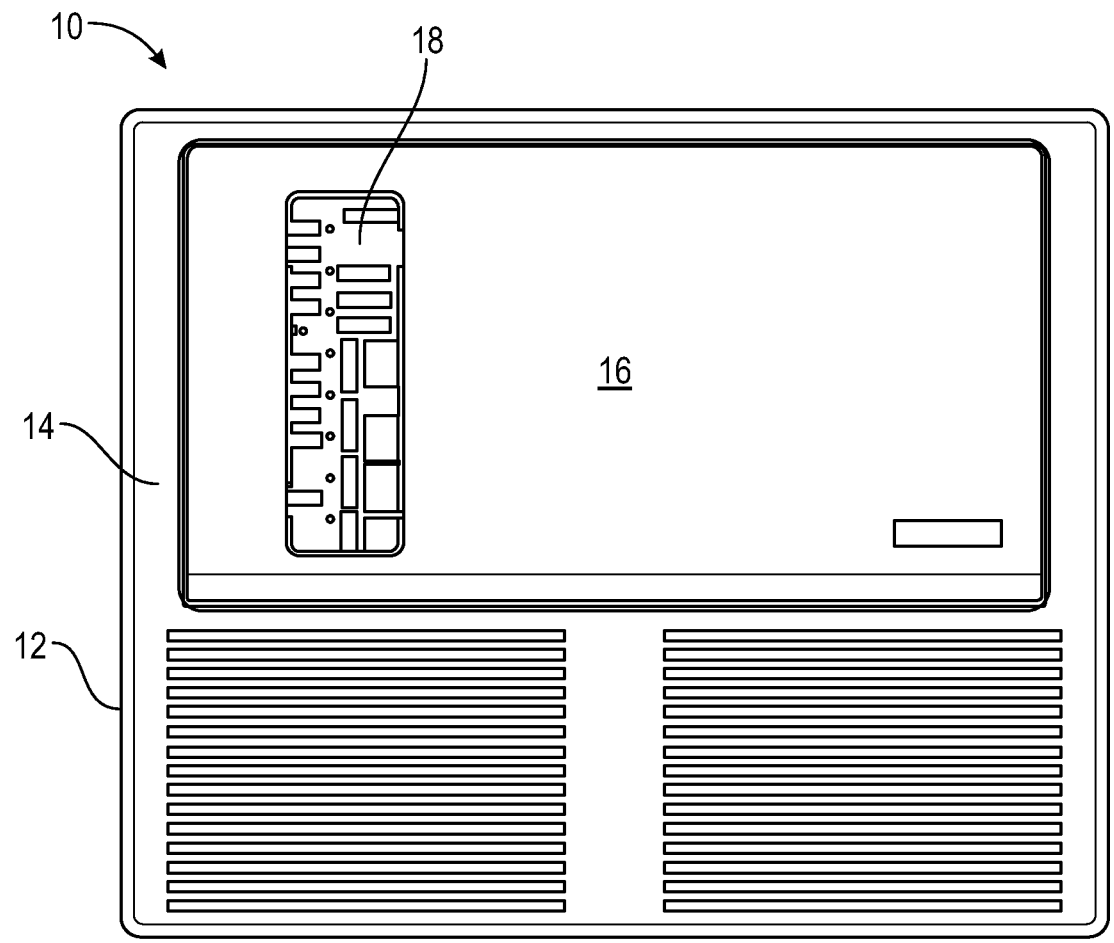
FIG. 1 is a front view of the smart power center.
Figure 2:
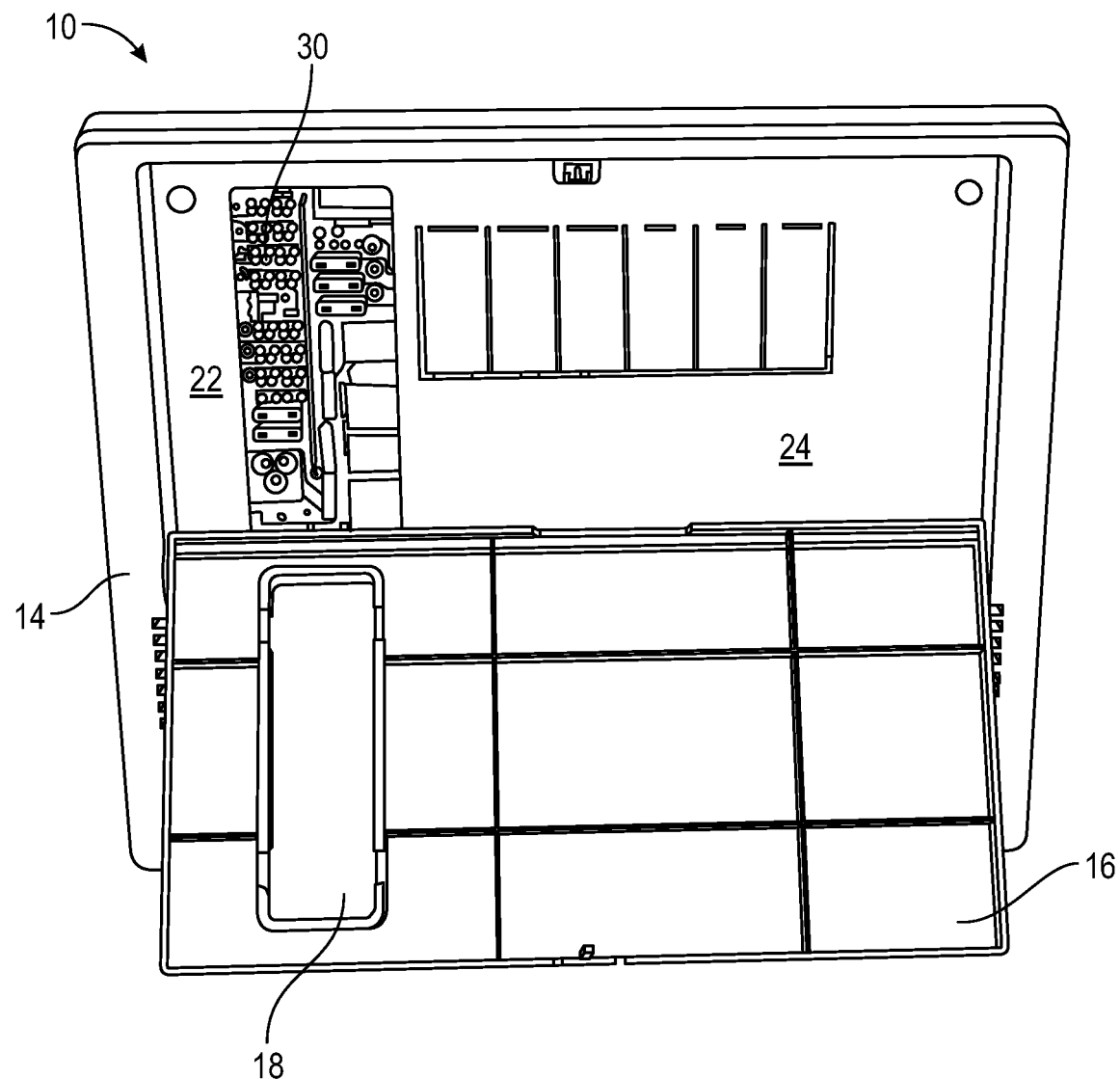
FIG. 2 is a front view of the smart power center in FIG. 1 with the access panel open.
Figure 3:
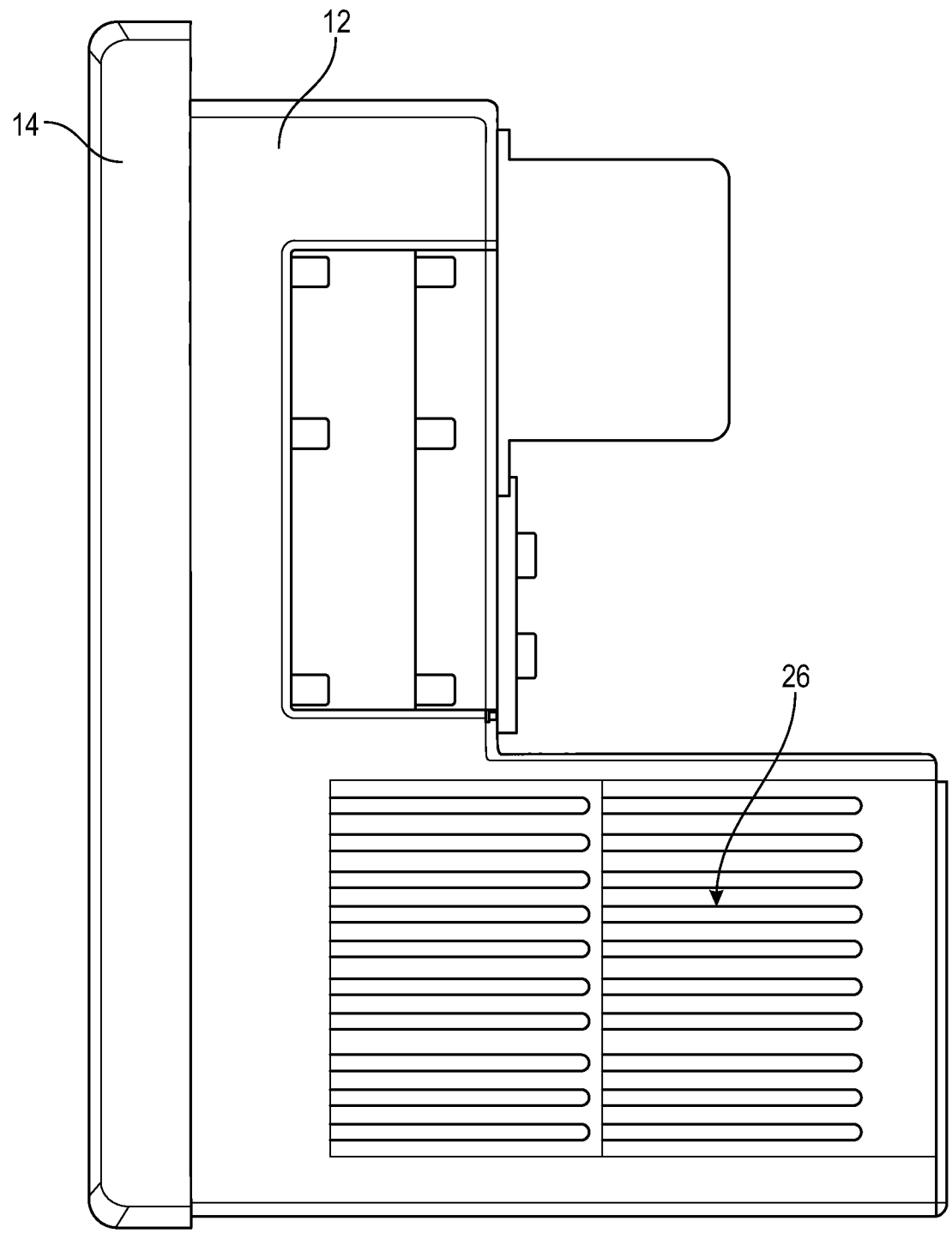
FIG. 3 is a side view of the smart power center in FIG. 1.
Figure 4:
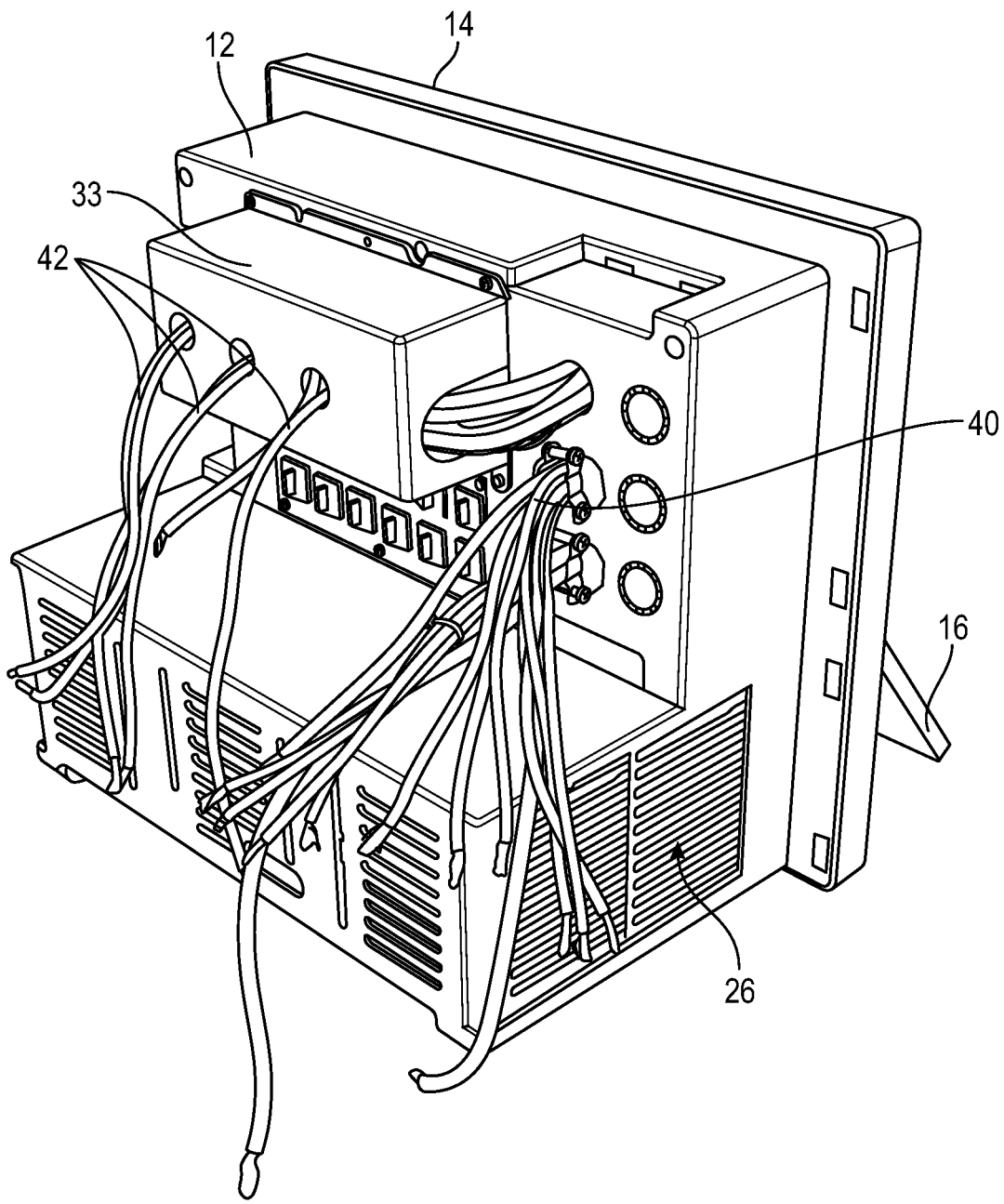
FIG. 4 is a rear perspective view of the smart power center in FIG. 1.
Figure 5:
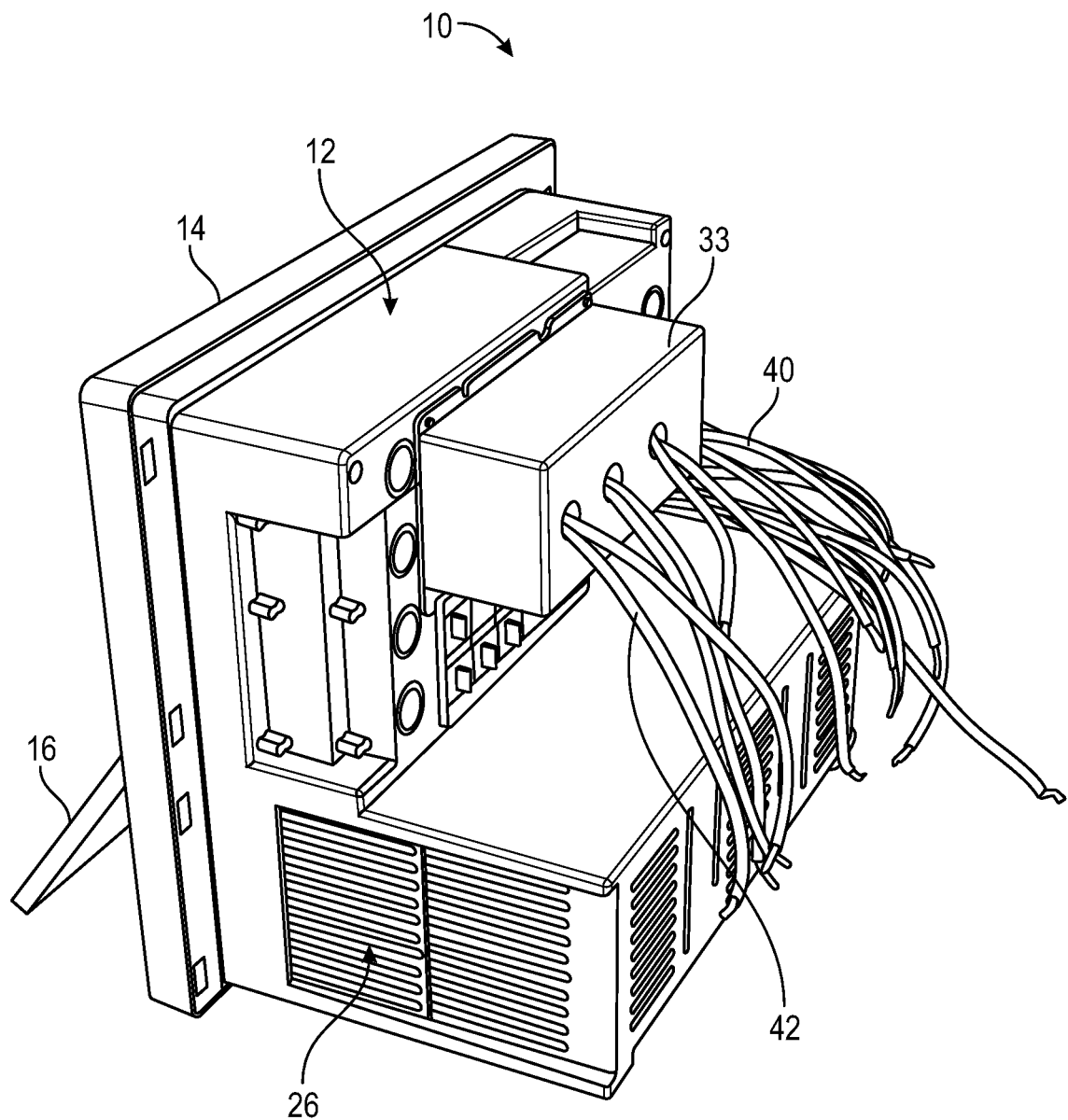
FIG. 5 is a second rear perspective view of the smart power center in FIG. 1.
Figure 6:
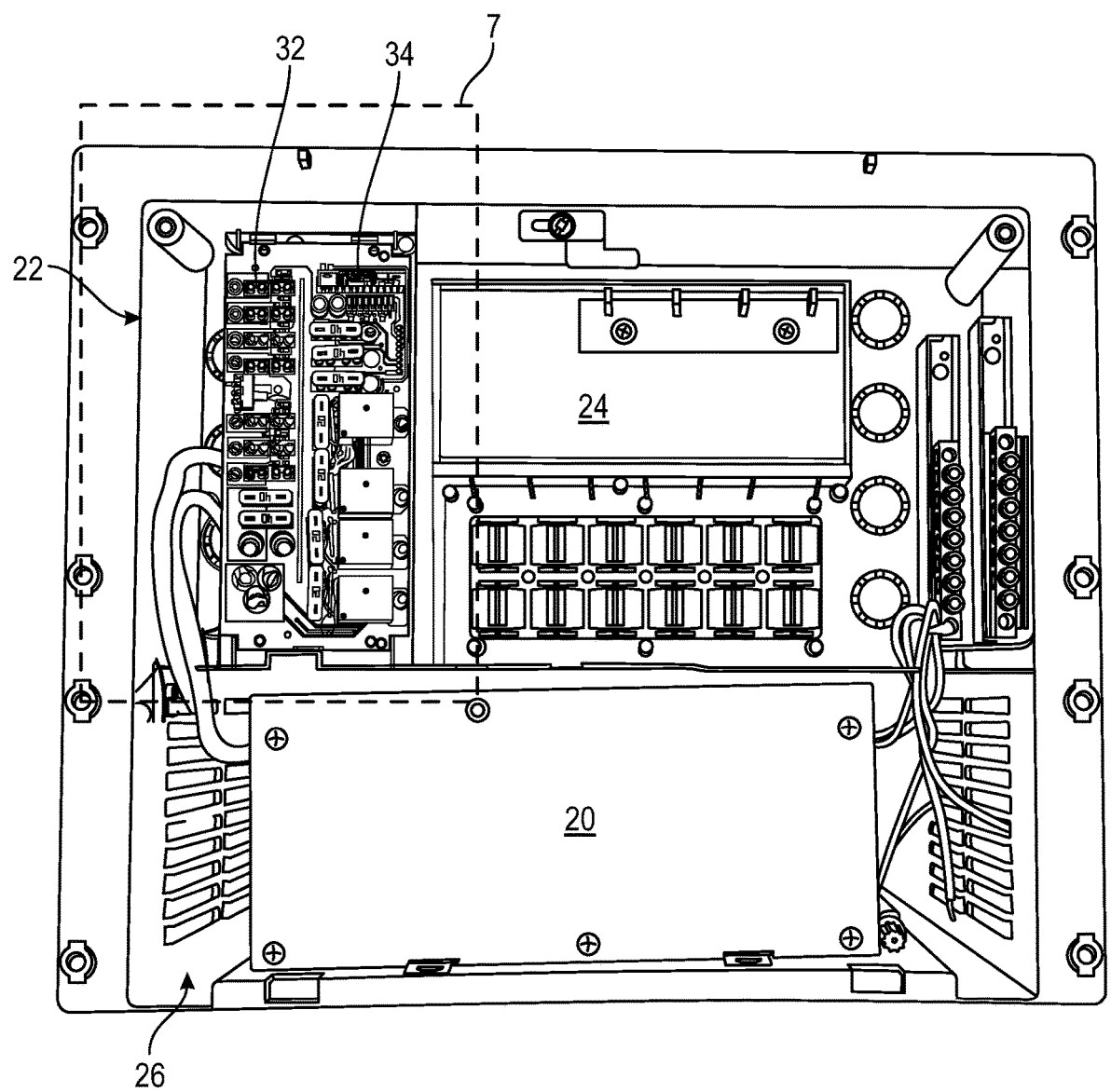
FIG. 6 is a front view of the smart power center with the front cover removed.
Figure 7:
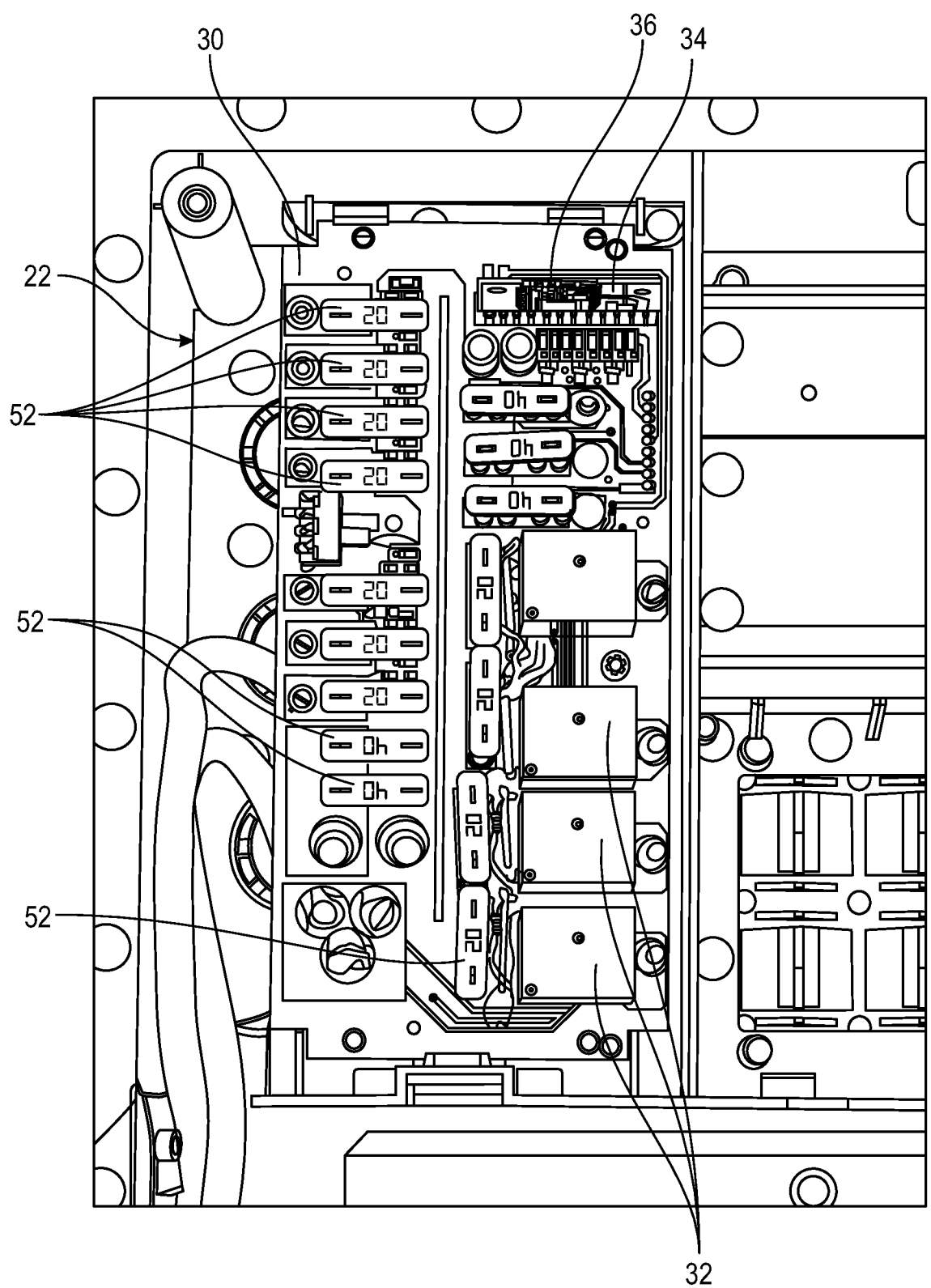
FIG. 7 is a partial view 7 of the power center in FIG. 6.

A smart RV power center 10 is shown in FIGS. 1-7. The power center 10 is used to distribute AC (alternating current) and DC (direct current) power. In the RV environment, AC power comes from shore power, an inverter, or generator. Shore power is used when the RV is parked at a location, such as a campground. An inverter or generator (not shown) can be used while traveling. 120v or 240v AC power, the same as is used in homes and businesses, is commonly is used for high-wattage appliances, such as rooftop air conditioners or electric heaters. DC power is typically a 12 volt system and comes from a power converter 20, batteries 44, solar panels, or the vehicle's engine. The power center 10 distributes and manages AC and DC power through fuses 11, AC circuit breakers 25, relays, and a power converter 20 to power the appliances 38, DC devices 13, and controlled DC devices 15.

The power center 10 has a housing 12 with a removable front cover 14 and an access panel 16 for the user to check the status of the circuit breakers and fuses 11. The access panel 16 includes a window 18 for the user to see the status of lights and fuses and also provides convenient user access to fuse replacement without exposing connections and wires. Should the user need to access connections, wires, or power converter 20, the front cover 14 can be removed, shown in FIG. 6. The housing 12 is separated into different portions, such as a DC portion 22, AC portion 24, and converter portion 26. The DC portion 22 has a circuit board 30 that controls power to different DC devices 13, 15. The AC portion 24 holds circuit breakers (not shown) and, as installed, is wired to AC power sources 28 and AC power devices 38. The converter portion 26 holds the power converter 20, which is a device that generates DC power when the RV is attached to external AC power 28. The power converter 20 can also be used to charge the batteries 44. In some embodiments, the power converter 20 is located separately from the housing 12. The housing 12 includes various apertures and egress points for electrically connecting the power center 10 to the electrical systems of the RV.

Figure 8:
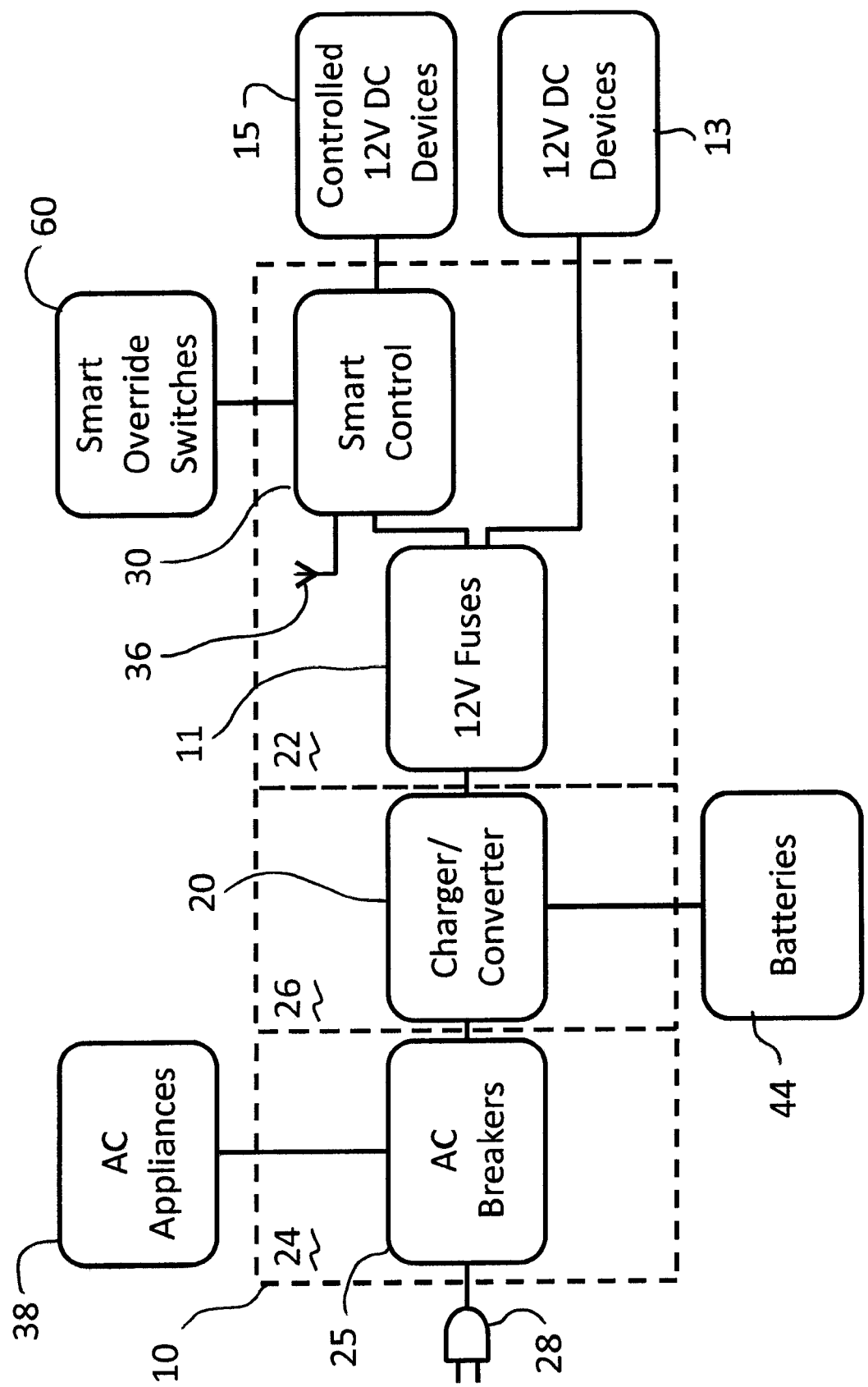
FIG. 8 is a block diagram of the smart power center showing it connected to external devices.
Figure 9:
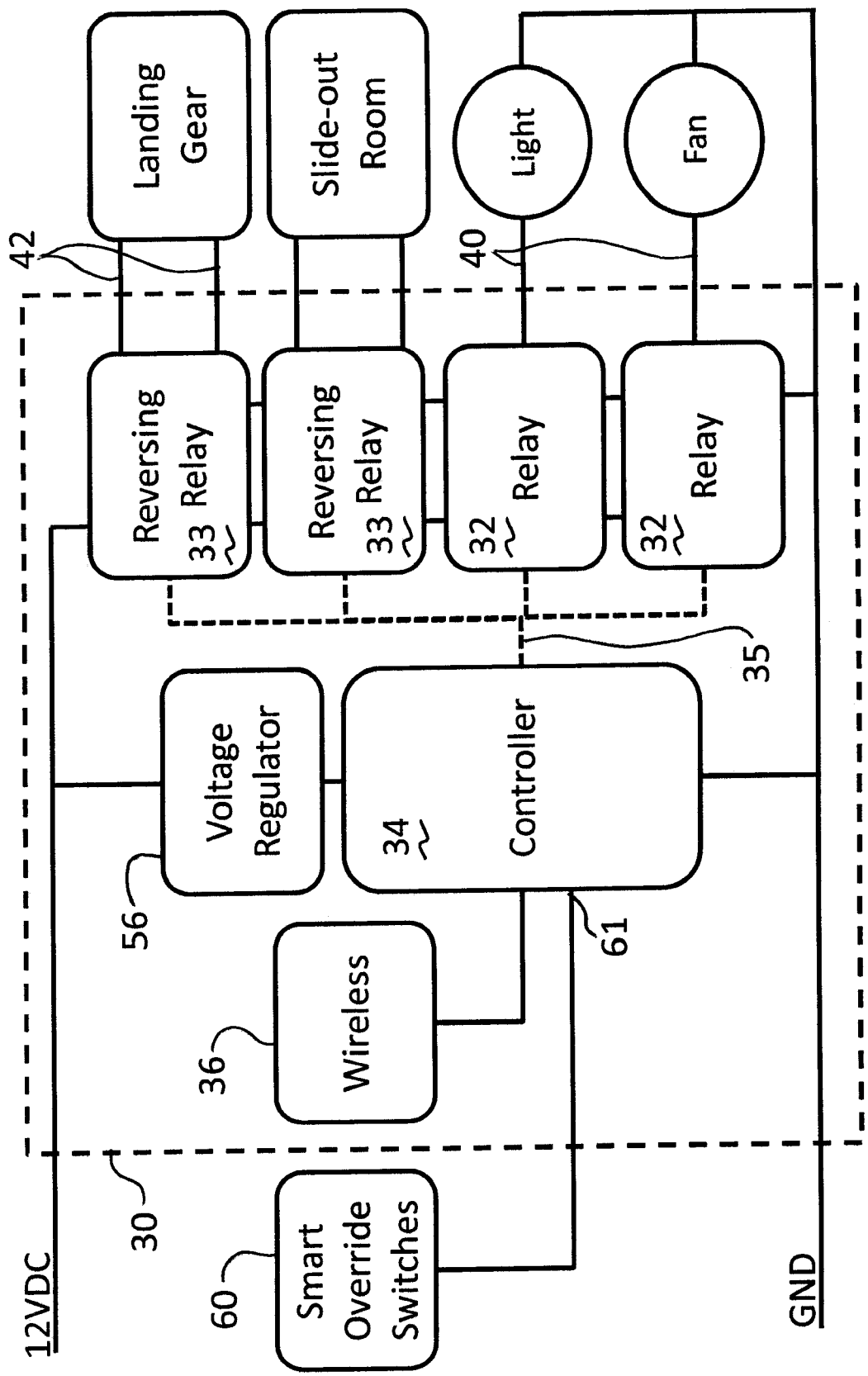
FIG. 9 is block diagram of the relay and control board.
Figure 10:
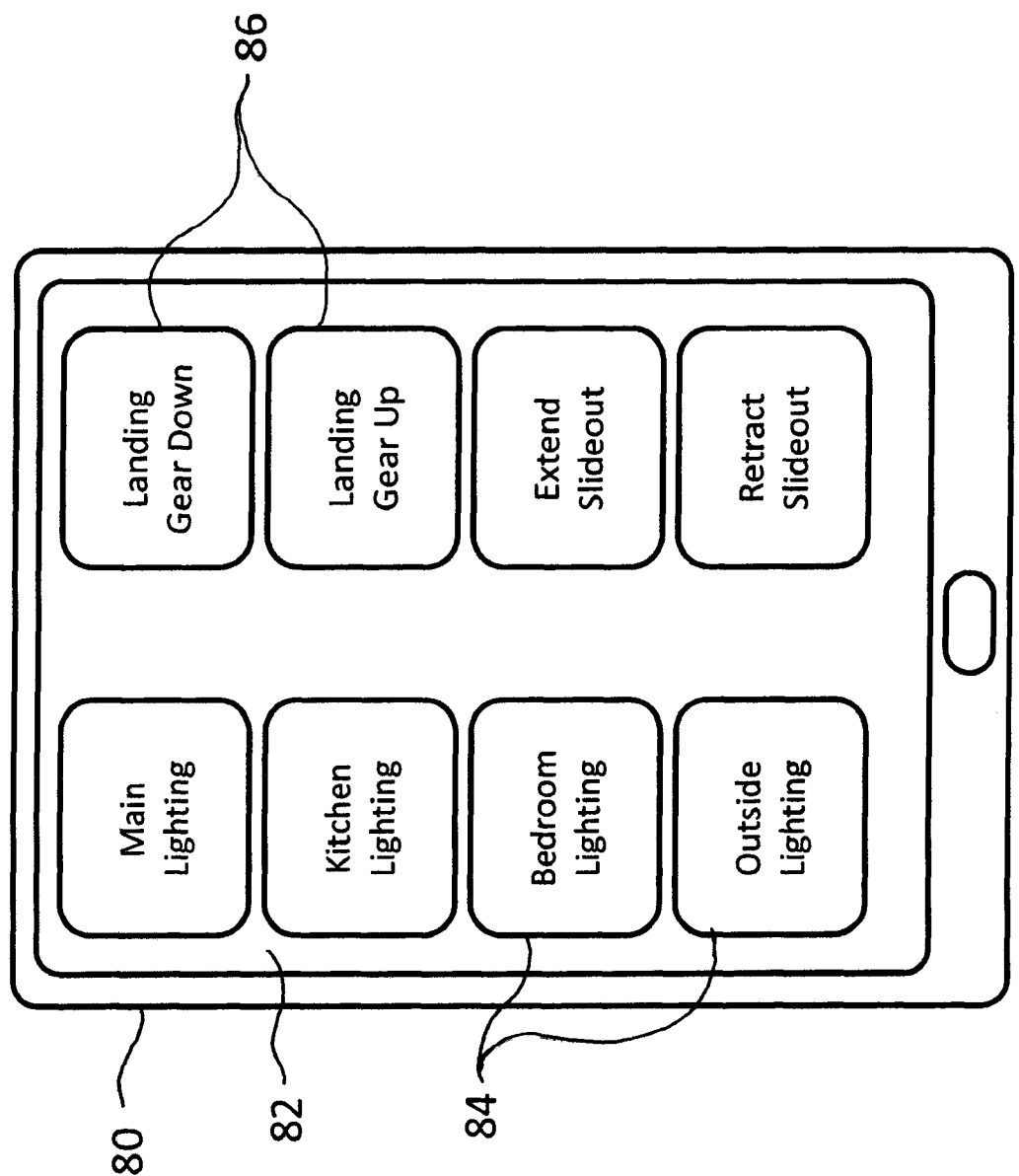
FIG. 10 is a mobile device showing the app allowing control of smart outputs.

The circuit board 30 contains relays 32, 33 that are electrically connected to a controller 34. The circuit board 30 and controller 34 are shown in FIGS. 8-9. It receives power from a 12V DC source, which is then distributed to fuses 52, indicator lights 54, and a voltage regulator 56. The voltage regulator 56 conditions power for integrated circuits, like the wireless interface 36 and controller 34. The relays 32, 33 may be mechanical or solid-state. In either case, the relay 32, 33 connects and disconnects the DC source (shown as 12 VDC in FIG. 9) and the DC device (shown as devices connected to 40, 42). The controller 34 is connected to a wireless interface 36 that may or may not be located on its own circuit board. It is contemplated that the wireless interface 36 is integrated with the circuit board 30 and/or controller 34. The relays 32 switch DC power to switched outputs 40, and are otherwise known as latching relays, due to how they are controlled. Some relays 33 are capable of reversing the polarity of the output, and are otherwise known as reversing or momentary relays, due to how they are controlled. The reversing outputs 42 can be connected to motors that can move awnings, slide-out rooms, landing gear, or the like, shown in FIG. 9.

In order to control the relays 32, the controller 34 is in electrical communication with the wireless interface 36, shown in FIG. 9. When the controller 34 receives a command from the wireless interface 36, it changes the status of the corresponding relay 32, 33.

A mobile device 80 runs an application 82 that connects to the wireless interface 36, either through Bluetooth, NFC, Wi-Fi, or other wireless communication protocol. The application sends commands to and receives status information from the wireless interface 36. The commands are used to control the outputs 35 of the controller 34, which in turn control the relays 32, 33. The outputs may be momentary or latching, depending on the intended use. For example, if the relay is used for a light, it could be set up as a latching output so that the output would remain on after the command from the user is sent. It is contemplated that if it was a motor, it may be desirable for the output to remain on only as long as the user is holding the button down, such as a motorized moving component, and the user may only want it to move part of the way. The application 82 uses virtual buttons 84, 86 to send commands to change the status of the relays 32, 33. The virtual buttons 84, 86 are customizable and can be named to match the name of the controlled DC device 15 to which it is mapped. Buttons 84 are directed towards latching outputs, which control relays 32. Pressing the virtual button 84 toggles the output status of the relay 32, such that if the switched output 40 is in the "off" state, a press switches it to the "on" state. An additional press of the virtual button 84 toggles switched output 40 back to the "off" state. Buttons 86 are directed towards the momentary outputs, which control reversing relays 33. For the momentary outputs, the reversing relays 33 are only on as long as the user is holding the virtual button 86 down. For example, if the user desires to raise the landing gear, they would hold down the corresponding button 86 for as long as it takes to raise it to the desired position. As soon as the landing gear is retracted to the desired level, the user releases the virtual button 86, which turns off the reversing relays 33 wired to the landing gear.

In the event that the mobile device 80 and wireless interface 36 in the power center 10 lose connection, the device may be configured to drop power for momentary and/or reversing outputs. For latched relay outputs, such as lighting or other constantly powered devices, the power center 10 would maintain the status of the relays 32. In the event that communication between the mobile device 80 and power center 10 is erratic, irregular, or inconsistent, either due to the user being nearly out of range or from external interference, the mobile application can alert the user and/or act as if the connection has been lost.

In addition to the control by the mobile device 80, smart override switches 60 can be connected to the controller 34. The smart override switches 60 are shown in FIGS. 8-9 and are wired to inputs 61 on the controller 34. The smart override switches 60 are used when the user desires control of the relays 32, 33 and smart outputs (switched outputs 40 and reversing outputs 42) without the mobile device 80. Each relay 32, 33 or smart output would have corresponding a corresponding input. In FIG. 9, the block diagram shows only one input 61, but each smart output would have an input. The smart override switches 60 are wired to the inputs 61 on the circuit board 30 that communicate with the controller 34 with signals. By wiring the smart override switches 60 to the controller 34, conflicts and incompatible inputs by the user can be ignored or resolved before any of the outputs 40, 42 are turned on. This eliminates short circuits internal to the smart power center 10 or damage to the devices connected to the outputs 40, 42. For the switched outputs 40, the smart override switches 80 could be a momentary switch, toggle switch, rocker switch, or any similar switch. For the reversing outputs 42, the smart override switches 80 are momentary. The user must hold down the button the entire time to enable the corresponding reversing output 42.

Should the user not want the switched outputs 40 to be controlled through their mobile device 80, the power center includes a bypass switch to enable all switched outputs, excluding reversible/momentary outputs. Bypassing the outputs would either cause the controller 34 to turn on all relays 32 (excluding reversing or momentary outputs) or create a connection across the relay contacts. For this configuration, the reversing or momentary outputs would need to be wired to external reversing switches (not shown) through unswitched DC outputs, or reversing switches could be incorporated into the power center 10 directly.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A smart power center for mounting to a recreational vehicle and controlling external electrical devices by an application on a mobile device, said smart power center comprising:
   an AC input;
   a DC input for connecting to a DC power source;
   a power converter electrically connected to said AC input and said DC power source, said power converter for converting AC power to DC power;
   a controller electrically connected to said DC power source, said controller having a wireless portion for communicating with said mobile device, said controller in electrical communication with a first and second relay, said first and second relays for switching power from said DC power source to said external electrical devices;
   said first relay being a latching relay with a single output for connecting said DC power source to one of said external electrical devices;
   said second relay being a momentary reversible relay with outputs having reversible polarity for connecting to another of said external electrical devices; and
   said controller has a first input and a second input, said first and second inputs for wiring to smart override switches, said first input receiving a signal from a first said smart override switch, said second input receiving a signal from a second said smart override switch, said controller controlling said first and second relays in response to said signals from said first and second smart override switches.

2. The smart power center in claim 1, wherein said application has virtual buttons, each said virtual button controls one of said relays through wireless communication.

3. The smart power center in claim 2, wherein said virtual buttons are customizable.

4. The smart power center in claim 1, wherein if said mobile device loses communication to said wireless interface, said controller will maintain said first relay output.

5. The smart power center in claim 1, wherein if said mobile device loses communication to said wireless interface, said controller will disable said second relay output.

6. A smart power center for mounting to a recreational vehicle and controlling external electrical devices by an application on a mobile device, said smart power center comprising:
- an AC input;
- a DC input for connecting to a DC power source;
- a power converter electrically connected to said AC input and said DC power source;
- a controller electrically connected to said DC power source, said controller having a wireless portion for communicating with said mobile device, said controller in electrical communication with a first and second relay, said first and second relays for switching power from said DC power source to said external electrical devices;
- said first relay being a latching relay with a single output for connecting said DC power source to one of said external electrical devices;
- said second relay being a momentary reversible relay with outputs having reversible polarity for connecting to another of said external electrical devices; and
- wherein if said mobile device loses communication to said wireless interface, said controller will maintain said first relay output.

7. The smart power center in claim 6, wherein said application has virtual buttons, each said virtual button controls one of said relays through wireless communication.

8. The smart power center in claim 7, wherein said virtual buttons are customizable.

9. The smart power center in claim 6, wherein if said mobile device loses communication to said wireless interface, said controller will disable said second relay output.

10. A smart power center for mounting to a recreational vehicle and controlling external electrical devices by an application on a mobile device, said smart power center comprising:
- a DC input for connecting to a DC power source;
- a controller electrically connected to said DC power source, said controller having a wireless portion for communicating with said mobile device, said controller in electrical communication with a first and second relay, said first and second relays for switching power from said DC power source to said external electrical devices;
- said first relay being a latching relay with a single output for connecting said DC power source to one of said external electrical devices;
- said second relay being a momentary reversible relay with outputs having reversible polarity for connecting to another of said external electrical devices; and
- said controller has a first input and a second input, said first and second inputs for wiring to smart override switches, said first input receiving a signal from a first said smart override switch, said second input receiving a signal from a second said smart override switch, said controller controlling said first and second relays in response to said signals from said first and second smart override switches.

11. The smart power center in claim 10, wherein said application has virtual buttons, each said virtual button controls one of said relays through wireless communication.

12. The smart power center in claim 11, wherein said virtual buttons are customizable.

13. A smart power center for mounting to a recreational vehicle and controlling external electrical devices by an application on a mobile device, said smart power center comprising:
- a DC input for connecting to a DC power source;
- a controller electrically connected to said DC power source, said controller having a wireless portion for communicating with said mobile device, said controller in electrical communication with a first and second relay, said first and second relays for switching power from said DC power source to said external electrical devices;
- said first relay being a latching relay with a single output for connecting said DC power source to one of said external electrical devices; and
- said second relay being a momentary reversible relay with outputs having reversible polarity for connecting to another of said external electrical devices; and
- if said mobile device loses communication to said wireless interface, said controller will maintain said first relay output.

14. The smart power center in claim 13, wherein if said mobile device loses communication to said wireless interface, said controller will disable said second relay output.

15. A smart power center for mounting to a recreational vehicle and controlling external electrical devices by an application on a mobile device, said smart power center comprising:
- a DC input for connecting to a DC power source;
- a controller electrically connected to said DC power source, said controller having a wireless portion for communicating with said mobile device, said controller in electrical communication with a first and second relay, said first and second relays for switching power from said DC power source to said external electrical devices;
- said first relay being a latching relay with a single output for connecting said DC power source to one of said external electrical devices;
- said second relay being a momentary reversible relay with outputs having reversible polarity for connecting to another of said external electrical devices; and
- if said mobile device loses communication to said wireless interface, said controller will disable said second relay output.

16. The smart power center in claim 15, wherein if said mobile device loses communication to said wireless interface, said controller will maintain said first relay output.

* * * * *